United States Patent
Baeder

[19]

[11] Patent Number: 6,059,296
[45] Date of Patent: May 9, 2000

[54] CHUCK FOR ROTATABLE TOOLS, IN PARTICULAR DRILLS, SCREW TAPS, ETC.

[75] Inventor: Siegfried Baeder, Koengen, Germany

[73] Assignee: Otto Bilz, Werkzeugfabrik GmbH & Co., Ostfildern, Germany

[21] Appl. No.: 09/274,840

[22] Filed: Mar. 23, 1999

[30] Foreign Application Priority Data

May 13, 1998 [DE] Germany .......................... 198 21 270

[51] Int. Cl.[7] .............................. B23B 5/06; B23B 31/07
[52] U.S. Cl. ............................... 279/20; 279/22; 279/75; 408/56
[58] Field of Search ................................. 279/20, 22, 30, 279/75, 82, 904, 905; 408/56; 470/103

[56] References Cited

U.S. PATENT DOCUMENTS

| 3,398,965 | 8/1968 | Cox .......................................... 279/30 |
| 3,436,086 | 4/1969 | Glenzer .................................... 279/30 |
| 4,640,652 | 2/1987 | Rivera, Jr. ................................ 408/56 |
| 5,311,654 | 5/1994 | Cook ........................................ 408/56 |
| 5,573,255 | 11/1996 | Salpaka ................................... 279/75 |
| 5,755,448 | 5/1998 | Kanaan et al. ........................... 279/75 |

FOREIGN PATENT DOCUMENTS

| 0 170 604 A1 | 2/1986 | European Pat. Off. . |
| 2239849 | 2/1975 | France ..................................... 408/56 |
| 40 19 427 A1 | 1/1992 | Germany . |
| 40 19 427 C2 | 4/1994 | Germany . |
| 43 22 552 A1 | 1/1995 | Germany . |
| 195 44 556 A1 | 6/1997 | Germany . |
| 196 54 010 A1 | 7/1998 | Germany . |

Primary Examiner—Steven C. Bishop
Attorney, Agent, or Firm—Michael J. Striker

[57] ABSTRACT

A chuck for a rotatable tool, such as a drill, a screw tap and the like has a chuck sleeve receivable in a machine and having a central receptacle, a sleeve provided for a tool and releasably inserted in the receptacle, the sleeve having a central main passage for a cooling and/or lubricating medium and grooves for supplying the cooling and/or lubricating medium in a longitudinal direction and outwardly of the tool, the sleeve having an axial opening adopted to extend over a whole length of a shaft of the tool for holding the shaft, the grooves for the cooling and/or lubricating medium in the sleeve being provided on an inner side of the axial opening and extending axially over a whole length of the sleeve, the grooves at one end communicating with the central passage in the chuck sleeve and at another end being axially freely open.

21 Claims, 1 Drawing Sheet

CHUCK FOR ROTATABLE TOOLS, IN PARTICULAR DRILLS, SCREW TAPS, ETC.

BACKGROUND OF THE INVENTION

The present invention relates to a chuck for rotatable tools, in particular drills, screw taps, etc.

A chuck of this type is disclosed for example in the German patent document DE 40 19 427 C2, in which cooling and/or lubricating medium flows through a central main passage of a chuck sleeve and is supplied into a coaxial and axially connected inner axial passage in the shaft of the tool, through which the lubricant passes over a substantial shaft length into the interior. Several radially extended openings are connected with the inner passage with the tool shaft and open at a peripheral side of a depressed distribution groove of the tool shaft. The tool shaft further has individual longitudinal grooves provided on its outer side. They start from the distributing groove and extend to the cutting edges of the tool, for example of a screw head of a screw tap as a tool. The lubricating medium is therefore guided first through the interior of the tool shaft and then is deviated substantially perpendicularly to the radial openings of the tool shaft. From there, the lubricating medium flows into the peripheral distributing groove in the tool shaft, and from it through the axially extending grooves in the tool shaft forwardly to the cutting edges of the tool. The shaft of the tool is surrounded by the sleeve substantially in the region where the circumferential distributing groove is located and on a short, bordering longitudinal portion. The sleeve is releasably insertable in the central inner receptacle of the chuck sleeve. The axial sleeve length is very short, in particular when compared to the axial length of the tool. First of all, it has the disadvantage that due to the relatively short guiding length, a not sufficient guidance of the inserted tool is provided. Also, first of all it is disadvantageous since the cooling and/or indicating medium which is supplied in the longitudinal direction of the tool at the outer side is slightly whirled when it reaches the end of the sleeve without providing a further supply of the lubricating medium in a longitudinal direction of the tool. The further disadvantage with respect to the guidance of the cooling and/or lubricating medium is that it has first the required guidance centrally through the tool shaft and subsequently a deviation by approximately 90° into the radial distributing openings and then another deviation substantially by 90° from the circumferential distributing groove into the individual longitudinal grooves on the outer side of the tool shaft.

The multiple deviation of the cooling and/lubricating medium and the danger of a whirling at the exit of the sleeve leads to the situation that an insufficient lubrication is provided in the region of the tool cutting grooves. Therefore the desired average quantity lubrication is not provided to the cutting edges of the tool, for example a screw head of a screw tap which constitutes substantially 0.5–5 ml per hour of the cooling/lubricating medium. In order to obtain such a low liquid flow rate, with a low over pressure, it was necessary to operate in the range of 3–5 bar and form a cloud enriched with cooling/lubricating particles. By multiple deviations in the flow course and the thusly formed edges required for it, the cloud can be condensed on the deviations and drops can be formed. As a result, a non-uniform lubrication is obtained, with which in the region of the deviations from the edges a droplet can be abruptly released and is supplied along the outer side of the tool, while during this time mainly no cooling/lubricating medium is guided along the tool. It is also disadvantageous that in the known construction of the tool the lubrication guidance must be adjusted to this specific type. The tool for this purpose must be provided at its end with a central inner lubricating passage, and furthermore the radially oriented openings as well as the peripherally depressed distributing groove and further the longitudinally extending, depressed grooves on the outer side of the tool must be provided. These individual openings and grooves weaken the cross-section of the tool, so that such features can be provided in large tools without negative influence on the strength of the tool. However, in small tools with small cross-sections, such openings and passages which substantially weaken the dimension of the tool are very disadvantageous in view of the strength considerations. In addition, such machining of the tool to provide a corresponding guidance of the cooling and/or lubricating medium is expensive.

SUMMARY OF THE INVENTION

Accordingly, it is an object of the present invention to provide a chuck of the above mentioned general type, which avoids the disadvantages of the prior art.

More particularly, it is an object of present invention to provide the chuck of the above mentioned general type which ensures a small quantity lubrication with good and disturbance-free transportation of the cooling and/or lubricating medium from a central guide through the chuck sleeve as close as possible to the cutting edges of the tool and require only small costs.

In keeping with these objects and with others which will become apparent hereinafter, one feature resides, briefly stated, in the chuck of the above mentioned type in which the grooves for the cooling and/lubricating medium are provided in a sleeve on an inner side of its axial opening, and extend axially through the whole length of the sleeve, and also communicate at one end with a central main passage in the chuck sleeves and open at another end axially free.

When the chuck is designed in accordance with the present invention, it provides for the above mentioned highly advantageous results.

Since the grooves are provided in the sleeve, the tool is free from special openings, grooves and other passages for the guidance of the cooling and/lubricating medium. The chuck is therefore suitable for each normal tool. Due to the axial passage of the cooling and/lubricating medium through the sleeve and a relatively great axial length, it is guaranteed that the cooling and/lubricating medium is supplied as close as possible and in a greatest possible quantity without problems and without substantial deviations to the cutting edges of the tool. With the inventive tool the conditions for a lubricating medium guidance without significant deviations and bypasses eliminates the above described disadvantages. Therefore a very favorable flow conditions are provided for the cooling and/lubricating medium, and the chuck in accordance with the present invention is especially advantageous for a small quantity lubrication.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
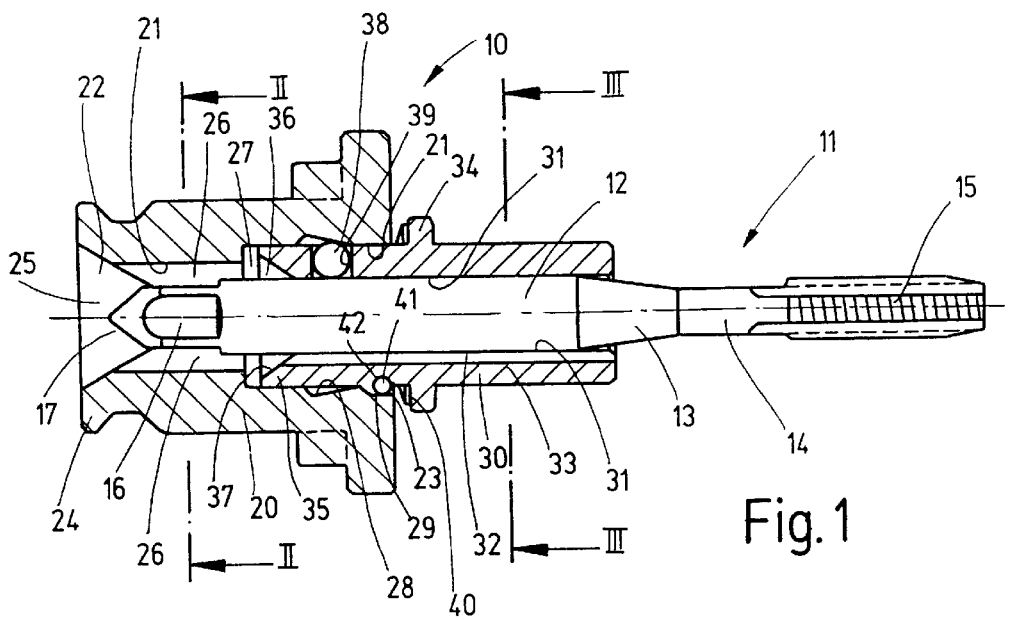
FIG. 1 is a schematic axial longitudinal section of a chuck for a rotatable tool in accordance with a first embodiment of the present invention.
Figure 2:
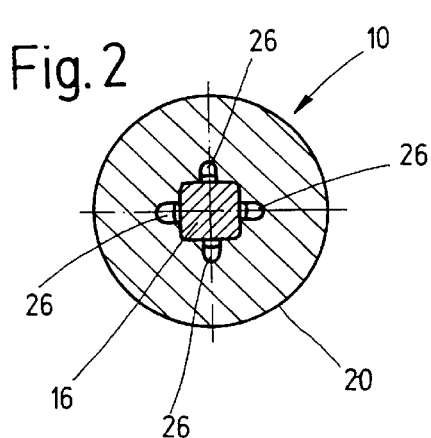
FIGS. 2 and 3 are views showing sections of the chuck shown in FIG. 1 taken along the lines II—II and III—III in FIG. 1.
Figure 3:
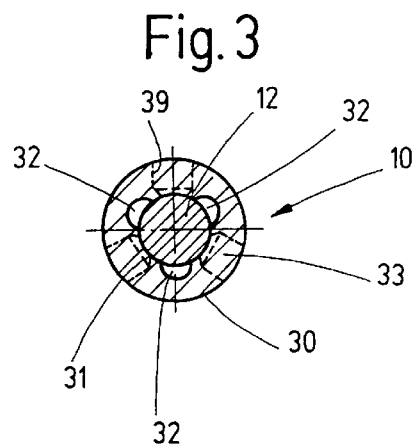

FIGS. 1–3 show a chuck 10 for a rotatable tool 11, in particular for a drill, and first of all for a screw tap shown as an example of the tool 11. The tool 11 has a shaft 12, a portion 13 which is connected with it and has an adjoining neck 14, and a screw head 15. At the opposite end it is provided with a pin 16 having a polygonal cross-section, in particular a four cornered cross-section for transmission of a torque from the chuck 10 to the tool 11. The tool 11 has a conventional shape. The end pin 16 has a free end 17 which is conical or spherical as disclosed for example in the German patent document DE 195 44 556 A1.

The chuck 10 in accordance with the first embodiment is formed as an insert, which at the machine side is clamped in an available, not shown chuck and held there. The chuck 10 in the first embodiment is rigid. However, in another, not shown embodiment it can be provided with an axial longitudinal compensation.

The chuck 10 of FIGS. 1–3 has a chuck sleeve 20 provided with a central inner receptacle 21 for a releasably insertable sleeve 30 for the tool 11, and a central main passage 22 for a cooling and/lubricating medium. The sleeve 30 has an axial opening 31 which extends over the whole length of the shaft 12 of the tool 11 and is used for receiving and holding of the shaft 12. Grooves 32 are provided in the sleeve 30 at the inner side of its axial opening 31. They extend axially over the whole length of the sleeve 30 and are open at both axial ends. In the shown embodiment, there are three grooves 32, which are distributed at substantially equal peripheral angular distances. The grooves 32 communicate with the central main passage 22 at the left end of FIG. 1 and serve for guiding the cooling and/lubricating medium which is supplied to the central main passage 22 and guided by the grooves 32 in the longitudinal direction of the tool 11 and outwardly as close as possible to the screw head 15.

The sleeve 30 has a substantial length and extends with a substantial longitudinal portion 33 axially from the receptacle 21 of the chuck sleeve 20. The shaft 12 of the tool and thereby a substantial longitudinal portion of the tool 11 is outwardly surrounded over a great axial length by the sleeve 30, in particular its longitudinal portion 33. Thereby the cooling and/or lubricating medium is guided over a substantial axial length through the grooves 32 loss-free and close to the screw head 15. This has the advantage when a small quantity lubrication is provided by an air-oil mixture. With the above described features, it is possible to bring a great quantity of the cooling and/lubricating medium to the cutting edges of the tool 11, in particular to the screw head 15, and therefore to provide there a good cooling and lubrication. The cooling and/or lubricating medium is guided without problems and risks of whirling from the supply in the central main passage 22 to the right open ends of the grooves 32 of the chuck 10, substantially in a laminar flow to the screw head 15. A substantial portion has a substantially same size longitudinal portion 33 of the sleeve 30, which overlaps a substantial longitudinal part of the tool 11, in particular in the region of the shaft 12.

The sleeve 30 has a radially projecting ring collar 34. During the axial displacement the sleeve 30 can abut with the ring collar 34 against a projecting end side 23 of the chuck sleeve 20. The substantialy longitudinal portion 33 of the sleeve 30 is connected axially to the ring collar 34 and engages the tool 11 over a substantial length of the cylindrical shaft 12. The chuck sleeve 20 has a substantially truncated-cone shaped supply opening 25 for the cooling and/or lubricating medium at the end 24 which faces away from the sleeve 30 and the end side 23. It reduces in direction toward the end 17 in a truncated-cone shape and thereby provides a desired central guidance of the supplied cooling and/or lubricating medium.

The sleeve 30 is provided with a central truncated-cone shaped inlet opening 36 for the cooling and/or lubricating medium at the end 35 which faces the chuck sleeve 10. The grooves 30 with their corresponding end are open into the inlet opening 36. The substantially truncated-cone shaped inlet opening 36 reduces in the same direction as the supply opening 25, namely in direction to the grooves 32 or in other words to the right in FIG. 5.

The greater diameter of the substantially truncated-cone shaped inlet opening 36 has a greater dimension than the diameter of the corresponding groove base of the groove 32 so as to form an outer ring-surface part 37. The part 37 extends radially outwardly beyond the grooves 32 and forms a guiding surface for the cooling and/or lubricating medium directed toward them.

The chuck sleeve 20 has axially extending grooves 26 for the cooling and/or lubricating medium provided on the inner side of a portion of the central inner receptacle 21. The grooves 26 open with their left end into the substantially truncated-cone shaped supply opening 25, while at their right end they are open to the inlet opening 36 of the sleeve 30. In the shown embodiment, the chuck sleeve 20 has several grooves 26 which extend one after the other in the peripheral direction at substantially equal angular distances, for example four grooves 26, which however is not completely necessary. A portion of the inner receptacle 21 of the chuck sleeve 20 has a substantially polygonal cross-section in this region, in particular four corner cross-section to adopt to the cross-section of the pin 16 of the tool 11. The four grooves 26 are located in the region of one side of the rectangle (FIG. 2). The groove depth of the grooves 26 in the chuck sleeve 20 has substantially the dimension corresponding to the groove depth of the grooves 32 in the sleeve 30. The cross-section dimension of the inner receptacle 21 of the chuck sleeve 20 in the region of the pin 16 substantially corresponds to the diameter of the axial opening 31 of the sleeve 30.

As shown in FIG. 1, a ring chamber 27 extends axially from the end 35 or the sleeve 30 and the substantially truncated-cone shaped inlet opening 36. The grooves 26 in the chuck sleeve 20 open into the ring chamber 27.

The sleeve 30 contains at least one clamping body 38, for example formed as a ball, in an associated wall passage 39. The clamping body 38 can radially deviate for releasing the sleeve 30 and the tool 11, into a ring groove 28 in the receptacle 21 of the chuck sleeve 20, which narrows substantially in a truncated-cone shaped manner in an axial direction. In the shown embodiment, three clamping bodies 38 are provided in the sleeve 30 as shown in FIG. 3, arranged in the ball passages 39 which follow one another and are arranged at the same peripheral angular distances. The corresponding wall passage 39 is provided not in the region of the groove 32 but in the peripheral direction in the regions between the two neighboring grooves 32 so that thereby no disturbance to the flow in the region of the groove 32 can occur.

Spring means which are identified as a whole with reference numeral 40 are provided between the sleeve 30 and the chuck sleeve 20. The spring means act on the sleeve 30 axially in a direction to the right in FIG. 1. The spring means 40 are moreover arranged outside of the chuck sleeve 20. Advantageously they are arranged between the ring collar 34 of the sleeve 30 on the one hand and the end side 23 of the chuck sleeve 20 on the other hand. For example, a wave spring can be provided as the spring 40 in a simple way.

A ball 41 is located in the axial groove 29 of the chuck sleeve 20 which opens to the right in FIG. 1. It is received in a depression 42 of the sleeve 30 and provides a rotation-securing of the sleeve 30 relative to the chuck sleeve 20.

In the position shown in FIG. 1, the chuck with the tool 11 inserted and clamped in it is ready for use to be inserted in a not shown machine chuck, in which the chuck 10 is clamped. The machine chuck for example is a known chuck, such as for example a screw tap chuck with a central supply for the cooling and/or lubricating medium. The axially supplied lubricating medium flows without deviation into the supply opening 25 and from it without great deviations and flow losses flows into the individual grooves 26 in the chuck sleeve 20. The truncated-cone shaped ends 17 of the pin 16 contributes to the disturbance-free inflow of the lubricating medium and its passage. The lubricating medium passes the grooves 26 and is supplied into the ring chamber 27, and from there is axially guided further into the inlet opening 36; then without great deviations it is supplied axially into the individual longitudinal grooves 32 of the sleeve 30 and passes the corresponding groove 32 of the associated outer surface of the shaft 12 of the tool 11 until the lubricating medium exits the right end of the sleeve 30 and the grooves 32 as a desired, substantially in an axis-parallel flow to be directed and supplied to the cutting edges of the screw head 15. During flowing through the chuck sleeve 20 and the sleeve 30 the cooling and/or lubricating medium provides a cooling of the part of the tool 11 which is located in this longitudinal region, or in other words in the pin 16 and the shaft 12. The lubricating medium exiting the sleeve 30 acts for cooling also of the portion 13 and the neck 14 as well as the associated screw head 15 of the tool 11, accompanied by the cooling of the surrounding wall region of an opening in a workpiece. The lubricating medium supplied to the screw head 15 provides a very good continuous lubrication in the region of the screw head 15.

Figure 4:
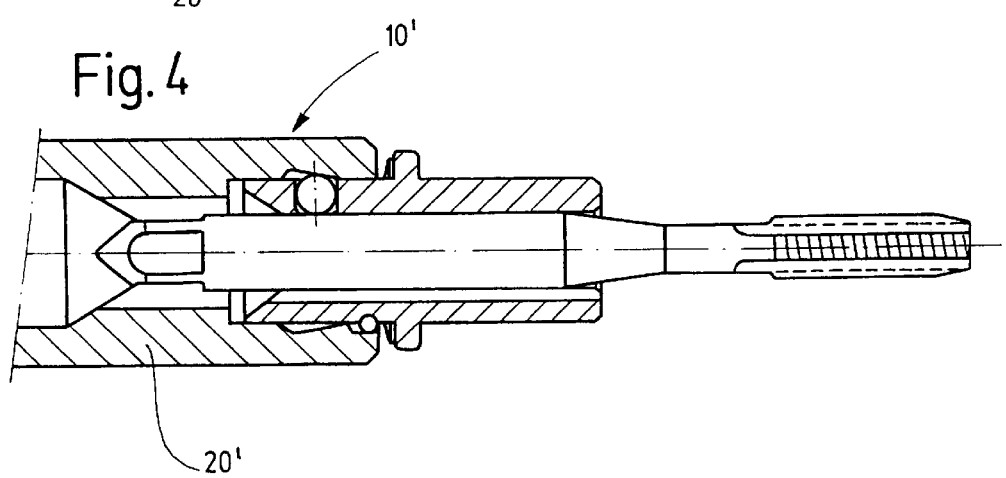
FIG. 4 is a view schematically showing an axial longitudinal section of a chuck in accordance with a second embodiment of the present invention.

In the second embodiment shown in FIG. 4 the same reference numerals are used for the parts which correspond to the parts of the first embodiment, so that their description is not repeated. The second embodiment shown in FIG. 4 differs from the first embodiment of FIGS. 1–3 in that the chuck sleeve 20' is here a part of the screw tap chuck, whose remaining part adjoins at the left side of FIG. 4 and is not shown further, but is well known. In other aspects, the chuck 10' of FIG. 4 substantially corresponds to the respective elements of the embodiment of FIGS. 1–3.

It will be understood that each of the elements described above, or two or more together, may also find a useful application in other types of constructions differing from the types described above.

While the invention has been illustrated and described as embodied in chuck for rotatable tools, in particular drills, screw taps, etc., it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A chuck for a rotatable tool, comprising a chuck sleeve receivable in a machine and having a central inner receptacle; a sleeve provided for a tool and releasably inserted in said receptacle, said chuck sleeve having a central main passage for a cooling and/or lubricating medium and grooves for supplying the cooling and/or lubricating medium in a longitudinal direction and outwardly of the tool, said sleeve having an axial opening adapted to extend over a whole length of a shaft of the tool for holding the shaft, said grooves for the cooling and/or lubricating medium in said sleeve being provided on an inner side of said axial opening and extending axially over a whole length of said sleeve, said grooves at one end communicating with said central main passage in said chuck sleeve and at another end being axially freely open, said chuck sleeve at an end facing away from said sleeve having a central, substantially truncated-cone shaped supply opening for the cooling and/or lubricating medium.

2. A chuck as defined in claim 1, wherein a cross-sectional dimension of said inner receptacle of said chuck sleeve substantially corresponds at least over a longitudinal partial region to a diameter of said axial opening of said sleeve.

3. A chuck as defined in claim 1, wherein said inner receptacle of said chuck sleeve has a polygonal cross-section for receiving a pin of the tool having a corresponding cross-section.

4. A chuck as defined in claim 3, wherein said inner receptacle of said chuck sleeve has a rectangular cross-section.

5. A chuck as defined in claim 1, wherein said chuck sleeve has four said grooves which are spaced from one another by substantially same angular distances.

6. A chuck as defined in claim 5, wherein said grooves of said chuck sleeve are arranged in a region of one side of a polygon of said inner receptacle.

7. A chuck for a rotatable tool, comprising a chuck sleeve receivable in a machine and having a central inner receptacle; a sleeve provided for a tool and releasably inserted in said receptacle, said chuck sleeve having a central main passage for a cooling and/or lubricating medium and grooves for supplying the cooling and/or lubricating medium in a longitudinal direction and outwardly of the tool, said sleeve having an axial opening adapted to extend over a whole length of a shaft of the tool for holding the shaft, said grooves for the cooling and/or lubricating medium in said sleeve being provided on an inner side of said axial opening and extending axially over a whole length of said sleeve, said grooves at one end communicating with said central main passage in said chuck sleeve and at another end being axially freely open, said sleeve at an end which faces said chuck sleeve having a central, substantially truncated-cone shaped inlet opening for the cooling and/or lubricating medium, in which said grooves are open with their ends.

8. A chuck as defined in claim 7, wherein said sleeve include three grooves which are spaced from one another by substantially equal angular distances.

9. A chuck as defined in claim 7, wherein said sleeve has a substantial length and a longitudinal portion having a substantial length and extending outwardly of said receptacle of said chuck sleeve.

10. A chuck as defined in claim 9, wherein said sleeve has radially projecting ring collar, with which said sleeve during an axial displacement for releasing from said chuck sleeve abuts against a spaced end side of said chuck sleeve.

11. A chuck as defined in claim 10, wherein said longitudinal portion of said substantial length of said sleeve is axially adjacent said ring collar and is adapted to engage and guide a shaft portion of an inserted tool over a substantial length.

12. A chuck as defined in claim 7, wherein a greater diameter of said substantially truncated-cone shaped inlet opening is greater than a diameter on which a groove base of said grooves extends, so that an outer ring surface part of said substantially truncated cone-shape inlet opening forms a guiding surface which extends radially outwardly of said grooves and is directed toward said grooves.

13. A chuck for a rotatable tool, comprising a chuck sleeve receivable in a machine and having a central inner receptacle; a sleeve provided for a tool and releasably inserted in said receptacle, said chuck sleeve having a central main passage for a cooling and/or lubricating medium and grooves for supplying the cooling and/or lubricating medium in a longitudinal direction and outwardly of the tool, said sleeve having an axial opening adapted to extend over a whole length of a shaft of the tool for holding the shaft, said grooves for the cooling and/or lubricating medium in said sleeve being provided on an inner side of said axial opening and extending axially over a whole length of said sleeve, said grooves at one end communicating with said central main passage in said chuck sleeve and at another end being axially freely open, said chuck sleeve at an end facing away from said sleeve having a central, substantially truncated-cone shaped supply opening for the cooling and/or lubricating medium, said sleeve at an end which faces said chuck sleeve having a central, substantially truncated-cone shaped inlet opening for the cooling and/or lubricating medium, in which said grooves are open with their ends.

14. A chuck as defined in claim 13, wherein said chuck sleeve at an inner side of a portion of said receptacle is provided with axially extending grooves for the cooling and/or lubricating medium, said grooves at one end being open in said substantially truncated cone shape supply opening and at another end being open to said inlet opening of said sleeve.

15. A chuck as defined in claim 14, wherein a groove depth of said grooves in said chuck sleeve substantially corresponds to a groove depth of said grooves in said sleeve.

16. A chuck as defined in claim 13; and further comprising a ring chamber which extends an end of said sleeve and said substantially truncated-cone shape inlet opening, said grooves of said chuck sleeve being open in said ring chamber.

17. A chuck as defined in claim 13, wherein said sleeve has at least one wall passage and at least one clamping body arranged in said at least one wall passage, said inner receptacle of said chuck sleeve having a substantially truncated-cone shaped narrowing ring groove, so that said clamping body can radially deviate from said wall passage into said ring groove.

18. A chuck as defined in claim 13; and further comprising spring means which loads said sleeve axially relative to said chuck sleeve.

19. A chuck as defined in claim 18, wherein said spring means are arranged outside of said chuck sleeve.

20. A chuck as defined in claim 18, wherein said spring means are arranged between a ring collar of said sleeve and a projecting end side of the chuck sleeve.

21. A chuck as defined in claim 20, wherein said spring means include a wave spring.

\* \* \* \* \*